(No Model.)
S. G. VOGELEY & A. A. ADAMS.
GLASSWARE.
No. 261,644. Patented July 25, 1882.
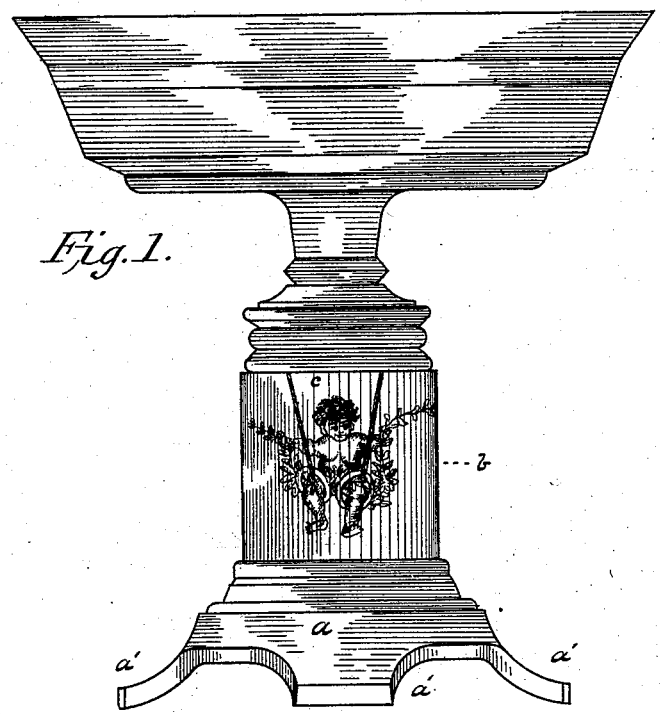
Fig. 1.
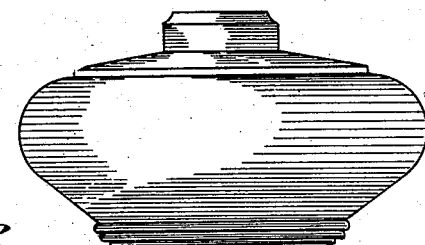
Fig. 2.
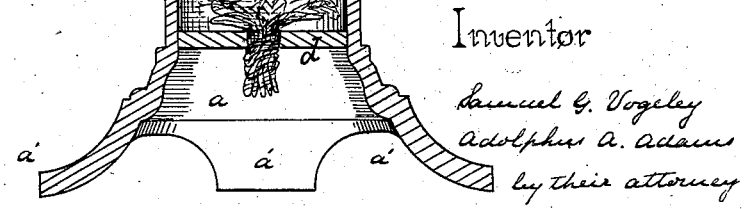
Witnesses
Jno. C. Smith
L. C. Fitler.
Inventor
Samuel G. Vogeley
Adolphus A. Adams
by their attorney
Bakewell & Kerr

UNITED STATES PATENT OFFICE.

SAMUEL G. VOGELEY AND ADOLPHUS A. ADAMS, OF PITTSBURG, PA.

GLASSWARE.

SPECIFICATION forming part of Letters Patent No. 261,644, dated July 25, 1882.

Application filed May 3, 1882. (No model.)

*To all whom it may concern:*

Be it known that we, SAMUEL G. VOGELEY and ADOLPHUS A. ADAMS, of Pittsburg, in the county of Allegheny and State of Pennsylvania, have invented a new and useful Improvement in Ornamental Glassware; and we do hereby declare the following to be a full, clear, and exact description thereof, reference being had to the accompanying drawings, forming a part of this specification, in which—

Figure 1 is a side elevation of our invention. Fig. 2 is a side elevation, partly in section.

Like letters of reference indicate like parts in each.

Our invention relates to an improvement in the manufacture of ornamental stems, stands, or supports of articles of glassware; and it consists mainly in combining with a transparent hollow stem or standard for lamps, salvers, and like articles of glassware an independent ornamental article or object inserted or inclosed within the same; and, secondarily, in combining with such a hollow transparent stem an independent detachable ornamental article or object inserted within the stem, and a detachable bottom, whereby the ornamental object may be changed at will.

Heretofore the stems of lamps, fruit-dishes, &c., have frequently been ornamented by forming them of porcelain or other opaque substance upon which the ornamental design is painted, or by pasting pictures or paintings upon the inner surface of hollow transparent stems and filling the cavity with paste, pitch, or other opaque substance, or coating the internal surface to protect and afford background to the ornamentation, which coatings or fillings are essential where the ornamentation is applied to the surface of the glass. These methods of ornamenting the stems are objectionable, in that they add to the weight of the stem or render it more easily broken, and are also objectionable in that they are complicated, require careful manipulation or skilled labor, which enhances the cost of production. Furthermore, the ornamentation cannot be readily changed at the will of the user.

We will now describe our invention, so that others skilled in the art may manufacture and use the same.

In the drawings, *a* represents the base or foot of the stem, which base may be supported by suitable feet, *a'*, if desired. Rising from the base *a* is the hollow stem *b*, which may be cylindrical in form, or of other design, if preferred, the hollow space extending from the base to within a short distance of the top of the same. This stem is of transparent material. Within the hollow stem *b* is placed an ornamental object, *c*, either suspended or otherwise secured therein, so that it may be seen through the transparent sides of the stem and be protected from dust and injury. The stem is then closed by a disk or bottom plate, *d*, which is preferably removably attached by any suitable means which will not obstruct the hollow stem or interfere with the object to be displayed. This ornamental object may be of any design, such as natural or artificial flowers, figures, &c. The base and stem described are formed according to the usual manner of forming articles of glassware. Attached to the top of the stem *b* is the bowl of the lamp, dish, salver, or other article. Although a particular design and shape is shown in the drawings, we do not desire to limit ourselves to the same.

The advantages of our invention are that a novel and apt method of ornamenting lamps, footed dishes, and other articles of glassware is produced, and a convenient receptacle afforded for holding and preserving natural flowers in connection with fruit-dishes.

The flowers or ornaments in the hollow stem may be changed from time to time by the provided movable disk or bottom for the mouth of the hollow stem.

Having thus described our invention, what we claim, and desire to secure by Letters Patent, is—

1. As a new article of manufacture, a transparent hollow stem, stand, or support for lamps or other articles, having an independent ornamental article or object inserted or inclosed therein, substantially as and for the purpose specified.

2. In an ornamental article of glassware—such as a lamp, salver, or like article—the combination of a transparent stem and independent detachable ornamental article inclosed thereby, and a detachable bottom plate for closing the stem, substantially as and for the purpose specified.

In testimony whereof we have hereunto set our hands this 29th day of April, A. D. 1882.

SAMUEL G. VOGELEY.
    ADOLPHUS A. ADAMS.

Witnesses:
  JAMES H. PORTE,
  ROBT. J. SAMPLE.